J. F. WAGNER.
SOIL PULVERIZING IMPLEMENT.
APPLICATION FILED DEC. 29, 1920.
1,420,351. Patented June 20, 1922.
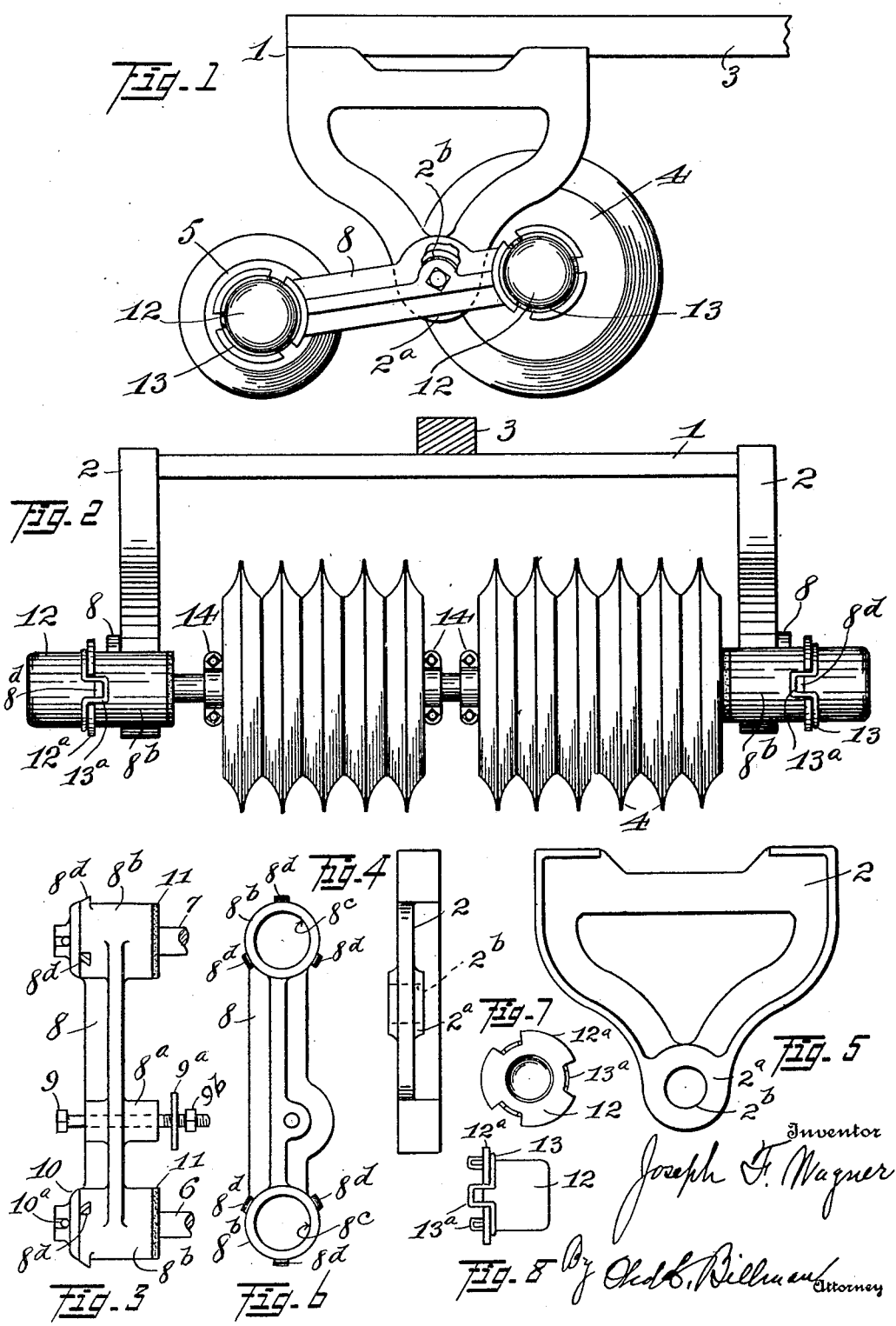

UNITED STATES PATENT OFFICE.

JOSEPH F. WAGNER, OF BEREA, OHIO, ASSIGNOR TO THE DUNHAM COMPANY, OF BEREA, OHIO, A CORPORATION OF OHIO.

SOIL-PULVERIZING IMPLEMENT.

1,420,351.   Specification of Letters Patent.   Patented June 20, 1922.

Application filed December 29, 1920. Serial No. 433,759.

*To all whom it may concern:*

Be it known that I, JOSEPH F. WAGNER, a citizen of the United States, residing at Berea, in the county of Cuyahoga and State of Ohio, have invented certain new and useful Improvements in Soil-Pulverizing Implements, of which the following is a specification.

My invention relates to improvements in soil pulverizing implements, and more particularly to that class or type of soil or earth working implements commonly known as "packers and mulchers" such as disclosed, for example, in the Dunham Reissued Patent No. 13,921, of June 1, 1915, and in which front and rear gangs of parallel extending packer discs are employed, the ends of the axles of the front and rear gangs being mounted in and connected by oscillatory gang bearing members pivotally or flexibly connected to the main implement or draft frame. In this type of implement it is desirable that means be provided whereby certain predetermined pulverizer or packer discs may be removed from the transversely extending axle shafts and the remaining packer or implement discs be secured in fixed spaced relation to provide suitable spaces to receive the rows of growing crops, such as corn or the like, and whereby the soil between such rows may be cultivated or packed and mulched. Heretofore this has been accomplished through what are known as "quick detachable discs," such as disclosed and claimed in Dunham Patent No. 1,237,182, of August 14, 1917.

The primary object of this invention is to provide a generally improved implement of the class mentioned of exceedingly simple and efficient construction, and to eliminate the need of such split or quick detachable packer discs through the medium of improved oscillatory gang bearing members attached to and mounted upon the implement or draft frame and to the ends of the gang axle shafts whereby the same may be readily attached to or detached from such draft frame and axle shafts without disassembling or disconnecting the main or draft frame from the subjacent oscillatory gang bearing members so that ordinary one-piece pulverizer discs may be employed and such discs may be readily placed upon or detached from such axle bearing shafts as well as spaced in any desired manner by simply detaching the gang bearing members from the ends of the draft or implement frame as will hereinafter be more fully explained.

With the above mentioned and other ends in view, the invention consists in the novel construction, arrangement and combination of parts, hereinafter described, illustrated in one of its embodiments in the accompanying drawings and particularly pointed out in the appended claims.

Referring to the drawings, forming a part of this specification, Figure 1 is a side elevation of a soil pulverizer or tillage implement constructed in accordance with this invention;

Fig. 2, a front elevation of the same, the rear disc gangs being omitted and a series of pulverizer or packer discs and separating collars being shown on the front gang axle shaft and before being arranged in their normal abutting working positions, and removing certain of the discs to form spaces for receiving or passing over rows of growing crops;

Fig. 3, a top plan view of one of the oscillatory gang bearing members detached from the ends of the draft frame and the gang axle shaft;

Fig. 4, a top plan view of one of the end bearing members or brackets of the draft frame, detached;

Fig. 5, a side elevation of the same;

Fig. 6, a side elevation of one of the oscillatory gang bearing or yoke members, detached;

Fig. 7, an end view of one of the detachable dust caps on the bearing ends of the oscillatory gang yokes and for protecting the bearings of the gang shafts;

Fig. 8, a side elevation of the same.

Similar numerals of reference designate like parts throughout all the figures of the drawings.

The improved soil pulverizer or tillage implement comprises a main implement or draft frame consisting, in the present instance, of transverse bars 1, provided at their ends with depending bearing members 2, the latter being in the present instance in the specific form of bearing brackets terminating at their lower ends in bearing heads 2$^a$, the latter being provided with bearing openings 2$^b$. The implement or draft frame is adapted to be drawn by means of a centrally located draft bar or tongue 3.

The improved implement preferably comprises front and rear gangs of soil pulverizer discs 4 and 5, respectively, the front pulverizer or packer discs 4, being preferably larger in diameter than the rear discs 5, and as a means of removably and adjustably mounting said discs 4 and 5, and providing means whereby an oscillatory or rocking movement will be permitted to said front and rear gangs of discs, to conform to or meet the varying contour of the surface being cultivated, front and rear axle shafts 6 and 7, respectively, are provided, the discs 4 and 5 being provided with suitable openings forming bearings and being loosely mounted on the shafts 6 and 7.

As a means of so pivotally or flexibly connecting the axles of the front and rear disc gangs to the bearing heads 2ª of the depending bearing members of the main or draft frame that the greatest weight and pulling stresses will be transmitted to the front disc gangs in view of their taking the initial and more difficult part of the pulverizing operation, oscillatory gang bearing or yoke members 8, are arranged between and connected to the ends of the shafts 6 and 7, the pivoted connections or points of oscillation between the members 8, and heads 2ª, of the brackets 2, being preferably closer to the front shaft 6, of the front discs 4 than to the rear. It will thus be seen that the pivots or points of oscillation of the yoke members 8, with respect to the draft frame, are between vertical planes passing through the axes of the shafts supporting the respective front and rear discs.

As a means of enabling the discs in the respective front and rear disc gangs to be removed from or adjusted on the front and rear axle shafts 6 and 7, without dismantling the main or draft frame so that if desired certain of the discs or packer wheels may be removed to form spaces or passes for receiving rows of growing crops, the gang bearing or yoke members 8, are arranged to be inserted or removed from the outer ends of the shafts 6 and 7, and the bearing heads 2ª, of the brackets 2, by providing the intermediate portions of the gang bearing members 8, with bearing lugs or heads 8ª, adapted to be inserted in the openings 2ᵇ, of the heads 2ª, said bearing or yoke members 8, being provided at their ends with bearing heads 8ᵇ, having bearing openings 8ᶜ, to receive and contain the ends of the shafts 6 and 7. As a further means of securing the bearing heads 8ª, in the openings 2ᵇ, when the parts are assembled, retaining bolts 9, may be passed through central openings in the lugs or heads 8ª with bearing washers 9ª, on the inner sides to engage with the inner sides of the bearing heads 2ª, the outer ends of the bolts being provided with nuts 9ᵇ. As a means of detachably securing the bearing heads 8ᵇ, of the bearing yoke members 8, upon the ends of the shafts 6 and 7, the latter may be provided on their outer sides with take-up caps 10, adapted to bear upon the outer sides of the heads 8ᵇ, and to be secured by means of cotter pins 10ª.

As a means of excluding dust and dirt from the bearings and rendering such bearings oil tight, felt washers 11, may be provided on the ends of the shafts 6 and 7, to abut against the inner sides of the bearing heads 8ᵇ, and the outer sides of the latter are provided with quick detachable dust excluding caps 12, adapted to take over the bearing caps 10, said caps 12 being preferably provided with rim portions 12ª, and having spring rings 13, retained upon the rim portions 12ª, the latter being provided with suitable recesses in which are arranged suitably spaced spring tongues 13ª, adapted to pass over and snap into engagement with inclined lugs 8ᵈ, on the bearing heads of the gang bearing yoke member 8.

In view of the arrangement described, it will be seen that when it is desired to remove or rearrange or adjust any of the discs of the front and rear disc gangs, the side gang bearing yoke members 8, at the side on which the adjustment or rearrangement is to be made, may be readily detached by removing the attaching bolt 9, and quickly detaching the caps 12, by removing one of the spring tongues 13ª, from one of the lugs 8ᵈ, and then removing the caps 12, from the axle shaft, whereupon one or more of the discs may be removed forming a space or pass, the adjacent discs being secured by means of a two-part clamping collar 14.

By means of the collars 14, any desired space or opening between certain predetermined discs may be formed as desired to receive rows of growing crops.

From the foregoing description, taken in connection with the accompanying drawings, the operation and advantages of my invention will be readily understood.

Having thus described one of the embodiments of my invention, what I claim and desire to secure by Letters Patent, is,—

1. In an earth working implement, including a draft frame and front and rear loosely mounted disc gangs and independent axle members, and oscillatory gang bearing members detachably connected to said gang axle members and to the outside of said draft frame whereby said gang bearing members may be detached outwardly from said draft frame and longitudinally of the ends of said axle members and the discs of said gangs be removed from said axle members.

2. In a soil pulverizer, an implement frame including depending bearing members, oscillatory gang bearing members on the outer sides of the latter, front and rear axles interposed between and carried by said gang bearing members, pulverizer discs carried by said axles, including quick detachable dust excluding end caps, means for detachably removing said gang bearing members from said axles, and means for detaching said gang bearing members from said depending bearing members of said frame without dismantling the latter.

3. In an earth working implement, including a transverse draft frame and front and rear parallel extending disc gangs, axle members loosely supporting said disc gangs, oscillatory gang bearing yoke members detachably connected to the ends of said gang axle members and the ends of said draft frame, and means on the outer sides of said yoke members whereby the latter may be detached from said axle members and said draft frame without dismantling the latter.

4. In a soil pulverizer, a transversely extending implement frame including depending end bearing members terminating in bearing heads and openings, oscillatory yoke members on the sides of the latter and having bearing lugs on their inner sides extending into said bearing openings, front and rear axles interposed between and carried by the ends of said bearing yoke members, pulverizer discs in front of and at the rear of the points of oscillation of said oscillatory yoke members, disc separating clamps on said axles, and means for detachably securing said bearing lugs of said yoke members in said bearing openings of said bearing heads and removing said bearing yoke members laterally from the ends of said axles.

5. In a soil pulverizer implement, including a draft frame and depending bearing brackets, front and rear axle bearing shafts, soil pulverizer discs loosely arranged on such shafts; clamps on said shafts for forming passes between said discs, gang bearing yoke members detachably connected to the ends of said gang axle shafts and arranged at the outer sides of and detachably connected to said brackets whereby said gang bearing yoke members may be detached laterally and said pulverizer discs be removed from or adjusted on said gang axle shafts without dismantling said draft frame.

6. In a soil pulverizer, a draft frame including depending bearing members having bearing openings, front and rear disk gangs and axle shafts extending transversely and parallel with each other below the horizontal plane of said draft frame, and bearing yoke members detachably connected intermediate their ends to the outside of said depending bearing brackets of said draft frame by means of bearing lugs extending inwardly into said bearing openings, said yoke members also having their ends detachably connected to the ends of said axle shafts whereby the disks of said disk gangs may be removed from or adjusted on said axle shafts by the outward lateral detachment of said bearing lugs of said bearing yoke members from the bearing openings of said depending bearing members without dismantling said draft frame.

7. In a soil pulverizer, a transverse draft frame including depending end bearing brackets terminating in bearing openings, gang bearing yoke members provided with inwardly extending bearing lugs extending into said bearing openings, means for inserting and removing said bearing lugs in said bearing openings from the sides of said end bearing brackets, axle shafts mounted in the ends of said gang bearing yoke members, means on the outer sides of the latter for removably securing said axle shafts, pulverizer discs mounted on said axle shafts, the axis of oscillation of said pivoted gang bearing yoke members on said draft frame being between vertical planes passing through the axes of said axle shafts, and being nearer to the front axle shaft than the rear to place the greater weight and pull on said front axle shaft.

8. In a soil pulverizer, a draft frame including depending end bearing brackets provided with bearing openings at their lower ends, gang bearing yoke members on the outer sides of said bearing brackets and provided with bearing lugs extending into said bearing openings, means for removably securing said bearing lugs in said openings from the outer sides of said gang bearing yoke members, axle shafts removably mounted in the ends of said gang bearing yoke members, pulverizer discs loosely mounted on said axle shafts, and means for adjusting and forming spaces between said pulverizer discs on said axle shafts, the axis of oscillation of said pivoted gang members on said draft frame being between vertical planes passing through the axes of said axle shafts, and means for detachably connecting said gang bearing yoke members to the outer ends of said axle shafts whereby said gang bearing yoke members may be detached from the ends of said axle shafts for adjustment or the insertion or removal of said pulverizer discs without disassembling said draft frame and gang bearing yoke members.

9. In a soil pulverizer, a draft frame including depending end bearing members, oscillatory disc gang bearing members carried at the sides of the latter, front and rear axles interposed between the ends of said oscillatory disc gang bearing members, and means on and detachable from the outer sides of said oscillatory disc gang bearing members whereby the latter may be detached from said axles and depending end bearing members of said draft frame without dismantling the latter.

10. In a soil pulverizer implement, including a draft frame and depending bearing brackets, front and rear axle bearing shafts, soil pulverizer discs loosely arranged on said shafts, gang bearing yoke members provided with bearings receiving the ends of said axle shafts and pivotally connected to said brackets, and means operable from the outer sides of said yoke members for detaching the latter from said axles and depending bearing brackets whereby said gang bearing yoke members may be detached laterally and said pulverizer discs be removed from or adjusted on said axle shafts without dismantling said draft frame.

11. In a soil pulverizer implement, a draft frame provided with end bearing heads, and oscillatory gang bearing yokes having bearing portions removably mounted in the latter.

12. In an earth working implement, including a draft frame and front and rear axle shafts and loosely mounted disc gangs, and oscillatory yoke members detachably connected to said axle shafts and draft frame whereby said gang yoke members may be detached outwardly from said draft frame and the ends of said axle shafts for the removal or rearrangement of the discs of said gangs on said axle shafts.

13. In an earth working implement, including a draft frame and front and rear loosely mounted disc gangs and independent axle members, and oscillatory gang yoke members detachably connected to the ends of said axle members and to the outer sides of said draft frame whereby said gang yoke members may be detached outwardly from said draft frame and longitudinally of the ends of said axle members for the removal of the discs of said gangs from the ends of said axle members.

14. In a soil pulverizing implement, a draft frame provided with bearings, two disc carrying shafts which are simultaneously movable vertically relatively to the frame, and means holding the shafts in fixed relation to each other and connecting them to said bearings and separable from said bearings while the latter remain in normal relative position.

15. In a soil pulverizing implement, a draft frame provided with bearings, two disc carrying shafts which are simultaneously movable vertically and oppositely relatively to the frame, means carrying the shafts in fixed relation to each other and connecting them to said bearings and separable from the bearings and from the frame while the latter remain in normal positions.

In testimony whereof I have affixed my signature.

JOSEPH F. WAGNER.